Figure 1:
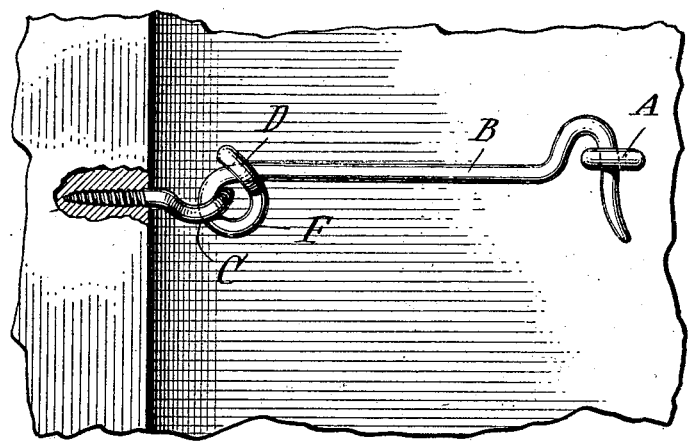

C. L. SMITH.
GATE HOOK.
APPLICATION FILED DEC. 24, 1908.

940,205.

Patented Nov. 16, 1909.

Witnesses:

Inventor:

UNITED STATES PATENT OFFICE.

CHARLES LAFE SMITH, OF PONCA, NEBRASKA.

GATE-HOOK.

940,205.     Specification of Letters Patent.     Patented Nov. 16, 1909.

Application filed December 24, 1908. Serial No. 469,181.

*To all whom it may concern:*

Be it known that I, CHARLES LAFE SMITH, a citizen of the United States, residing at Ponca, in the county of Dixon and State of Nebraska, have invented a new and useful Gate-Hook, of which the following is a specification.

My invention relates to improvements in a gate hook, said gate hook being used on screen doors, but it is also to be used on any hinged gate, and the objects of my improvement are, first, to avoid the hook arm from getting caught or lodging on any of its parts, as is the case with the gate hook now in use whose arm will lodge horizontally across the screw eye in the jamb, and as the screen door, or gate, or inside door swing shut they will strike the point of the hook arm marring and disfiguring said doors or gates, and by reason of the gate striking the hook it is knocked out of shape and loosened in the jamb, which can not possibly happen in my improved gate hook; second, that in my improved gate hook the hook arm at all times when not hooked to the gate will hang vertically under the screw eye in the jamb, and if it swings will swing parallel to the jamb, thus avoiding marring and scratching of same. I attain these objects by the mechanism illustrated in the drawing, in which:—

Figure 2:
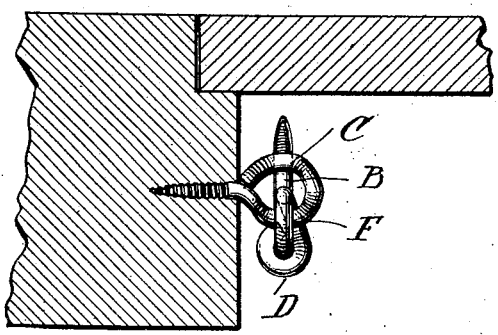
Figure 3:
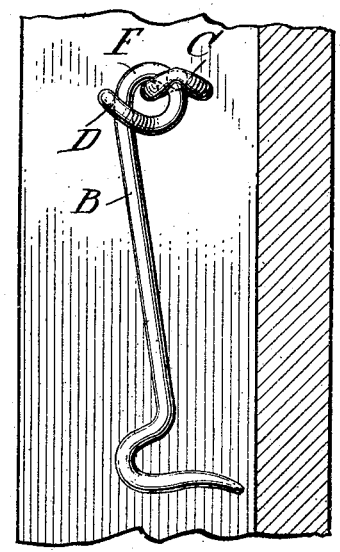

Figure 1, is the entire gate hook as it appears when attached to the jamb and hooked to the gate. Fig. 2, shows top view of the screw eye when in place in the jamb, and also shows the position that the hook arm assumes when detached from the gate. Fig. 3, shows a side view of the hook arm when detached from the gate and also shows end view of the screw eye that the hook arm is attached to.

Similar letters refer to similar parts throughout the several views.

In Fig. 1, A is the screw eye which is placed in the gate into which the hook arm B is hooked to hold the gate in place. (In the further description of this gate hook the above mentioned screw eye will not be referred to again.)

The eye F, on arm B, is formed on the lower side of said arm, this position of the eye is to permit of a brake or safety stop, said stop being made by leaving the wire forming the eye F just enough longer than is required to make said eye that it will reach up and over the top of arm B and around to the eye F. This forms the stop D that in connection with the eye F keeps the arm B from being raised higher than a point where, when released by the hand, after unhooking from the gate it will always drop to a vertical position, and its swinging motion is parallel to the jamb or other perpendicular surface where attached. This parallel swinging feature is attained by each top side center of the eye C being pressed downward just enough to retain the hook arm in a position with the point of the hook parallel to the jamb. In making above indentation in the eye C the top front side of said eye is left slightly raised, which throws the eye F into one side or the other of the eye C.

I claim:

In a gate hook, the combination of an eye formed on the under side of the arm B, with a stop D around said arm in front of the eye F, said eye connected to the screw eye C having depressed top side centers and its front center slightly raised all substantially as described and shown, for the purpose specified.

CHARLES LAFE SMITH.

Witnesses:
W. F. MIKESELL,
LESTER R. WATTS.